(12) United States Patent
Kwon et al.

(10) Patent No.: US 10,102,005 B2
(45) Date of Patent: *Oct. 16, 2018

(54) EXTERNAL INTRINSIC INTERFACE

(71) Applicant: Samsung Electronics Co., Ltd., Suwon-si (KR)

(72) Inventors: Kwon Taek Kwon, Seoul (KR); Seok Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,874

(22) Filed: Dec. 12, 2016

(65) Prior Publication Data

US 2017/0090943 A1 Mar. 30, 2017

Related U.S. Application Data

(63) Continuation of application No. 13/398,305, filed on Feb. 16, 2012, now Pat. No. 9,519,488.

(30) Foreign Application Priority Data

Jul. 25, 2011 (KR) .................. 10-2011-0073477

(51) Int. Cl.
*G06F 9/38* (2018.01)
*G06F 15/76* (2006.01)

(52) U.S. Cl.
CPC .......... *G06F 9/3881* (2013.01); *G06F 9/3869* (2013.01); *G06F 9/3877* (2013.01); *G06F 9/3885* (2013.01); *G06F 15/76* (2013.01)

(58) Field of Classification Search
CPC ............................ G06F 9/3877; G06F 9/3881
See application file for complete search history.

(56) References Cited

U.S. PATENT DOCUMENTS

| | | | |
|---|---|---|---|
| 6,493,818 B2 | 12/2002 | Robertson | |
| 7,293,159 B2 | 11/2007 | Doering et al. | |
| 7,490,221 B2 | 2/2009 | Evans et al. | |
| 7,546,441 B1 | 6/2009 | Ansari et al. | |
| 7,574,581 B2 | 8/2009 | Floyd et al. | |
| 7,590,829 B2 | 9/2009 | Johnson | |
| 7,647,475 B2 | 1/2010 | Svendsen et al. | |
| 7,664,928 B1 | 2/2010 | Andrews et al. | |
| 7,917,899 B2 | 3/2011 | Ota et al. | |
| 8,095,699 B2 | 1/2012 | Garg et al. | |
| 2002/0109682 A1 | 8/2002 | Nash et al. | |

(Continued)

FOREIGN PATENT DOCUMENTS

| | | | |
|---|---|---|---|
| JP | 2004-288203 A | 10/2004 | |
| JP | 2010-250662 A | 11/2010 | |
| KR | 1999-0064011 A | 7/1999 | |

(Continued)

OTHER PUBLICATIONS

Korean Office Action dated Feb. 20, 2017, in counterpart Korean Application No. 10-2011-0073477 (5 pages in English, 5 pages in Korean).

*Primary Examiner* — Benjamin P Geib
(74) *Attorney, Agent, or Firm* — NSIP Law

(57) ABSTRACT

An external intrinsic interface. A processor may include a core including a plurality of functional units, an intrinsic module located outside the core, and an interface module to perform relaying between the intrinsic module and a functional unit, among the plurality of functional units.

18 Claims, 5 Drawing Sheets

(56) References Cited

U.S. PATENT DOCUMENTS

2005/0166038 A1  7/2005  Wang et al.

FOREIGN PATENT DOCUMENTS

| KR | 10-2006-0040610 A | 5/2006 |
| KR | 10-0535852 B1 | 5/2006 |
| KR | 10-2007-0105328 A | 10/2007 |
| KR | 10-0998586 B1 | 12/2010 |

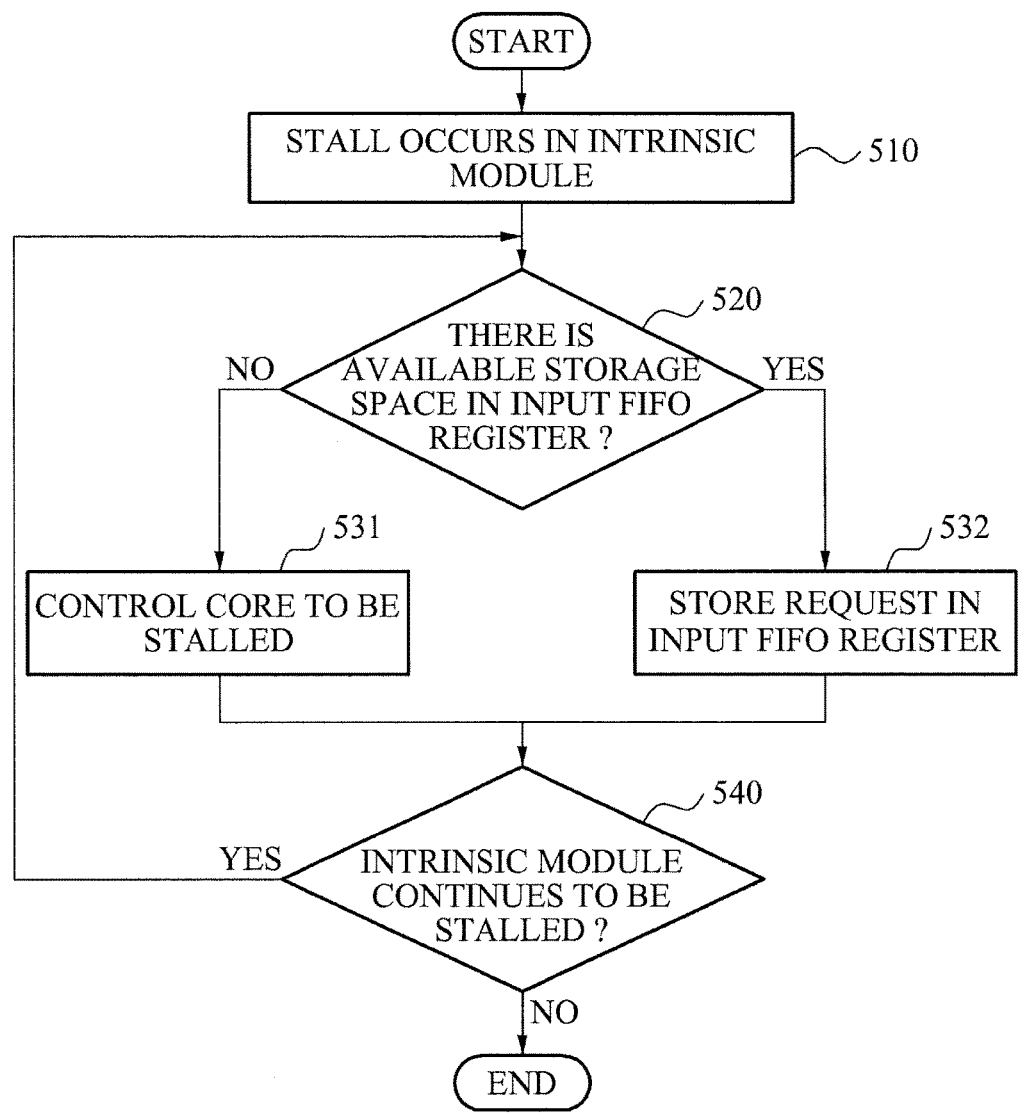

EXTERNAL INTRINSIC INTERFACE

CROSS-REFERENCE TO RELATED APPLICATIONS

This application is a Continuation of U.S. application Ser. No. 13/398,305 filed on Feb. 16, 2012, which claims the priority benefit of Korean Patent Application No. 10-2011-0073477, filed on Jul. 25, 2011, in the Korean Intellectual Property Office, the disclosure of which is incorporated herein by reference.

BACKGROUND

1. Field

Example embodiments of the following description relate to a processor, and more particularly, to a processor, using an intrinsic or embedded module.

2. Description of the Related Art

A conventional processor may include an intrinsic module 130 to perform additional operations, in addition to a basic intrinsic set. The intrinsic module 130 may be located within the conventional processor. Hereinafter, the conventional processor will be further described with reference to FIG. 1.

FIG. 1 illustrates a diagram of a structure of a conventional processor, using an intrinsic module 130.

Referring to FIG. 1, the conventional processor may perform basic operations, using a functional unit 120 located within a core 110, and may selectively perform additional operations other than the basic operations, using the intrinsic module 130. The intrinsic module 130 may also be located within the core 110, and may be connected to the functional unit 120.

Since the intrinsic module 130 is located within the core 110 and is connected directly to the functional unit 120 in the conventional processor, the intrinsic module 130 may be included in the same clock domain as the core 110. For example, when the core 110 is operated at a core clock 111 of 1 gigahertz (GHz), the intrinsic module 130 may also be designed to be operated at 1 GHz. In particular, since significant efforts are separately required by experts to design the intrinsic module 130 for a high operation speed of at least 500 megahertz (MHz), a burden on selecting the intrinsic module 130 as a predetermined solution may grow heavier. Additionally, there may be a need to design the intrinsic module 130 to be operated at a high speed, based on a clock domain of the core 110, even when the intrinsic module 130 does not require a high-speed operation.

The core 110 and the intrinsic module 130 are agreed about or need to be synchronized in a number of cycles that are required to output a result value in response to an operation request. Accordingly, to prevent incorrect calculation of waiting time (namely, latency) of both the core 110 and the intrinsic module 130, when a stall or wait occurs in one of the core 110 and the intrinsic module 130, the other needs to be also stalled, since the intrinsic module 130 is connected directly to the functional unit 120 within the core 110 in the conventional processor. In an example, when a stall 112 occurs in the core 110, the intrinsic module 130 also needs to be stalled. In another example, when a stall 132 occurs in the intrinsic module 130, the core 110 also needs to be stalled. Accordingly, the overall performance of the conventional processor may be reduced, due to an increase in a number of stalls occurring in the conventional processor.

SUMMARY

The foregoing and/or other aspects are achieved by providing a processor, including a core, having a plurality of functional units, an intrinsic module located outside the core, and an interface module to perform relaying between the intrinsic module and a functional unit, among the plurality of functional units.

The interface module may include an input first-in-first-out (FIFO) register, an output FIFO register, and a control unit.

When a clock domain of the core differs from a clock domain of the intrinsic module, the control unit may perform a clock domain crossing process on the intrinsic module and the functional unit, using the input FIFO register and the output FIFO register.

When a stall occurs in the core, the control unit may perform stall cycle hiding, using the output FIFO register.

When there is an available storage space in the output FIFO register, the control unit may store, in the output FIFO register, a result value received from the intrinsic module.

When a stall occurs in the intrinsic module, the control unit may perform stall cycle hiding, using the input FIFO register.

When there is an available storage space in the input FIFO register, the control unit may store, in the input FIFO register, a request received from the core.

The interface module may receive an operation request from the functional unit, transfer the received operation request to the intrinsic module, receive a result value corresponding to the operation request from the intrinsic module, and transfer the received result value to the functional unit.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 5 illustrates a flowchart of an operation of the interface module of FIG. 3 in an example in which a stall occurs in the intrinsic module of FIG. 3.

DETAILED DESCRIPTION

Figure 1:
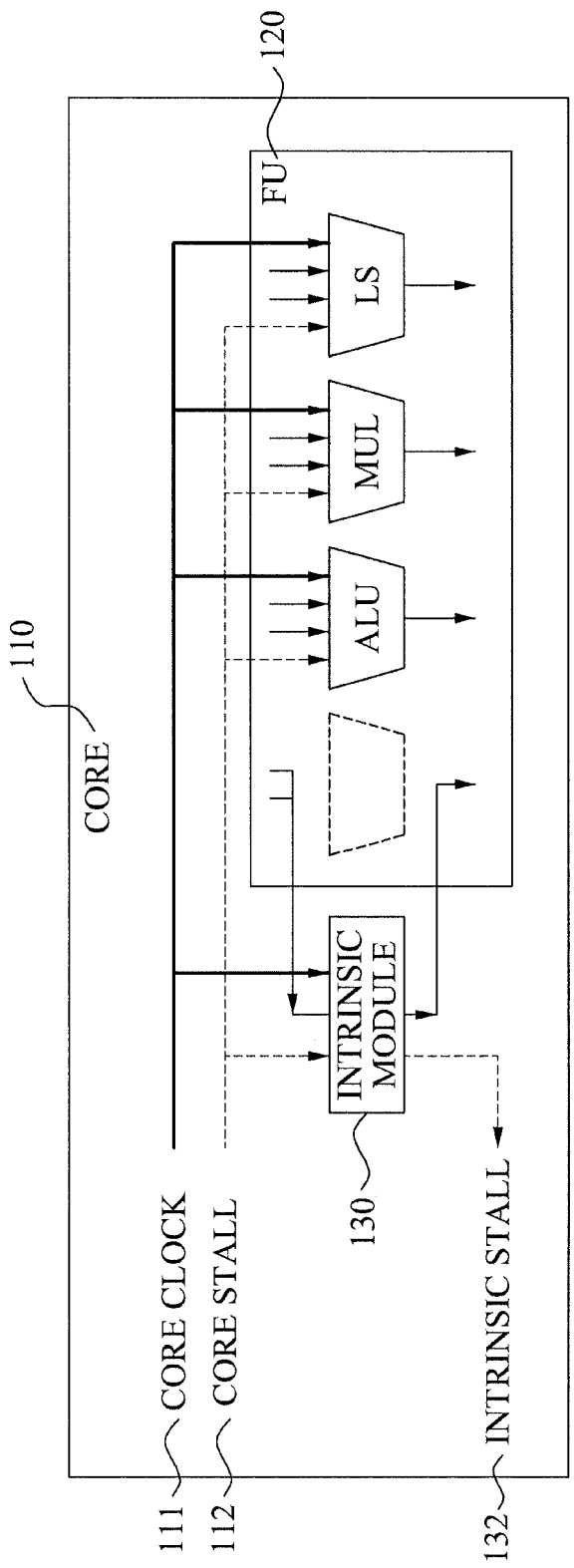
FIG. 1 illustrates a diagram of a structure of a conventional processor, using an intrinsic module.

Reference will now be made in detail to example embodiments, examples of which are illustrated in the accompanying drawings, wherein like reference numerals refer to the like elements throughout. Example embodiments are described below to explain the present disclosure by referring to the figures.

Figure 2:
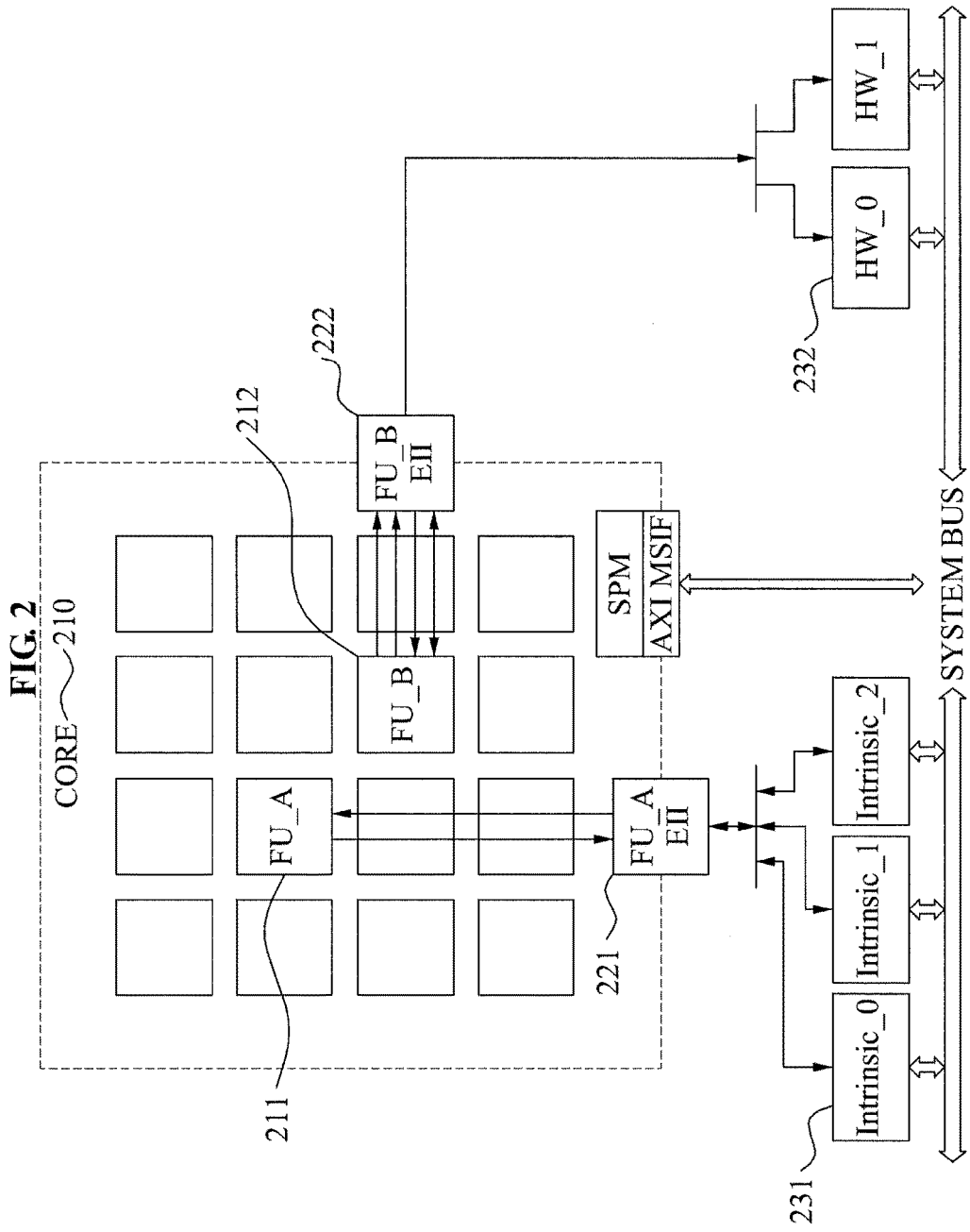
FIG. 2 illustrates a diagram of a structure of a processor according to example embodiments.

FIG. 2 illustrates a diagram of a structure of a processor, such as may be found in a computer, according to example embodiments.

The processor of FIG. 2 may include a core 210, interface modules 221 and 222, and intrinsic modules 231 and 232.

The intrinsic modules 231 and 232 may be located outside the core 210. Additionally, the interface modules 221 and 222 may perform relaying between the intrinsic modules 231 and 232 and functional units 211 and 212. The functional units 211 and 212 may be located within the core 210. The interface modules 221 and 222 perform relaying between the core 210 and the intrinsic modules 231 and 232, which are located outside the core 210. Further, the interface modules 221 and 222 may be called "external intrinsic interfaces."

The core 210 may include a plurality of functional units, for example, the functional units 211 and 212. Additionally, a plurality of intrinsic modules, for example, the intrinsic modules 231 and 232, may be installed outside the core 210. A plurality of interface modules, for example, the interface modules 221 and 222, may also be provided, and may perform relaying between the plurality of functional units with the plurality of intrinsic modules, respectively. In a non-limiting example, the interface module 221 may perform relaying between the functional unit 211 and the intrinsic module 231. In another non-limiting example, the interface module 222 may perform relaying between the functional unit 212 and the intrinsic module 232.

According to an aspect of the following description, an interface module may receive an operation request from a predetermined functional unit, among the plurality of functional units in a core, and may transfer the received operation request to an intrinsic module that corresponds to the predetermined functional unit. Additionally, the interface module may receive a result value corresponding to the operation request from the intrinsic module, and may transfer the received result value to the predetermined functional unit.

For example, the interface module 221 may receive an operation request from the functional unit 211, and may transfer the received operation request to the intrinsic module 231. The operation request may include, for example, opcode, operand, and the like. Additionally, the interface module 221 may receive a result value corresponding to the operation request from the intrinsic module 231, and may transfer the received result value to the functional unit 211.

Depending on example embodiments, a single functional unit may be connected to a plurality of intrinsic modules. For example, a plurality of intrinsic modules 231 may be connected to the functional unit 211. In this example, the interface module 221 may search for a corresponding intrinsic module, among the intrinsic modules 231, based on an opcode received from the functional unit 211, and may perform relaying between the found intrinsic module and the functional unit 211.

According to another aspect, an intrinsic module may be used as a load and/or store (LD/ST) intrinsic module. For example, the interface module 222 may perform an LD/ST operation of reading and writing a predetermined value at an address given by an argument, rather than receiving an operation request from the functional unit 212, receiving a result value from the intrinsic module 232, and transferring the result values. Accordingly, even an intrinsic module required to be set through a control register setting before performing an operation in response to an operand may perform a required setting by accessing the control register simply without an overhead of using a separate AXI port.

Hereinafter, configurations of the interface modules 221 and 222 will be further described with reference to FIG. 3.

Figure 3:
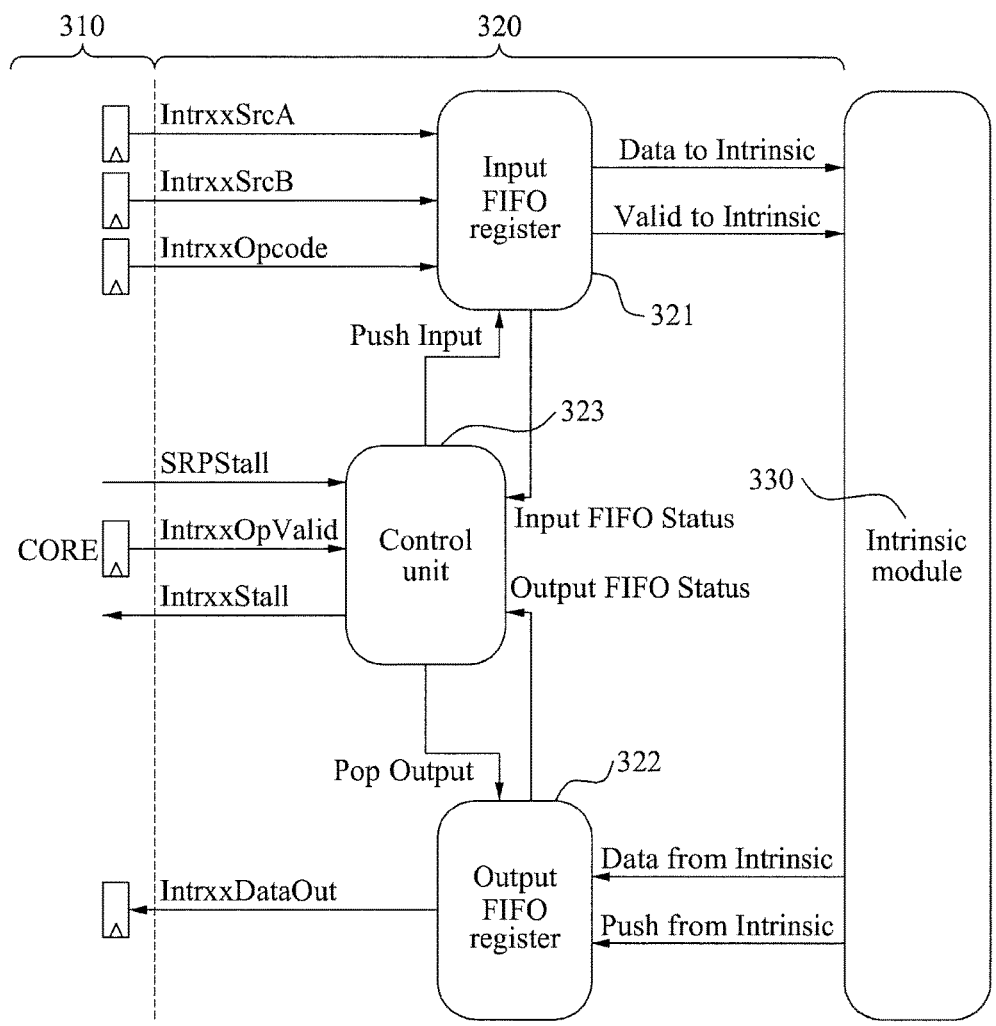
FIG. 3 illustrates a diagram of a configuration of an interface module according to example embodiments.

FIG. 3 illustrates a diagram of a configuration of an interface module 320, according to example embodiments.

Referring to FIG. 3, the interface module 320 may include an input FIFO register 321, an output FIFO register 322, and a control unit 323. Specifically, the interface module 320 may perform a queuing process, using the input FIFO register 321 and the output FIFO register 322.

When a clock domain of a core 310 in a processor differs from a clock domain of an intrinsic module 330, the interface module 320 may perform a clock domain crossing process, to prevent loss of a signal of the core 310 and a signal of the intrinsic module 330.

More specifically, when the clock domain of the core 310 differs from the clock domain of the intrinsic module 330, the control unit 323 of the interface module 320 may perform the clock domain crossing process on a functional unit included in the core 310 and on the intrinsic module 330, using the input FIFO register 321 and the output FIFO register 322.

For example, when it is difficult for the intrinsic module 330 to receive all requests based on a request generation speed, due to a difference in operation speed between the core 310 and the intrinsic module 330, the control unit 323 may store the requests in the input FIFO register 321, and may transfer the stored requests to the intrinsic module 330, based on a speed that the intrinsic module 330 may receive requests.

According to an aspect, when a stall occurs in the core 310 or in the intrinsic module 330, the interface module 320 may perform a stall cycle hiding process through the queuing process, so that the core 310 and the interface module 320 may have no influence on performance of the core 310 and the interface module 320.

Hereinafter, an operation of the interface module 320 when a stall occurs in the core 310, and an operation of the interface module 320 when a stall occurs in the intrinsic module 330 will be described with reference to FIGS. 4 and 5, respectively.

Figure 4:
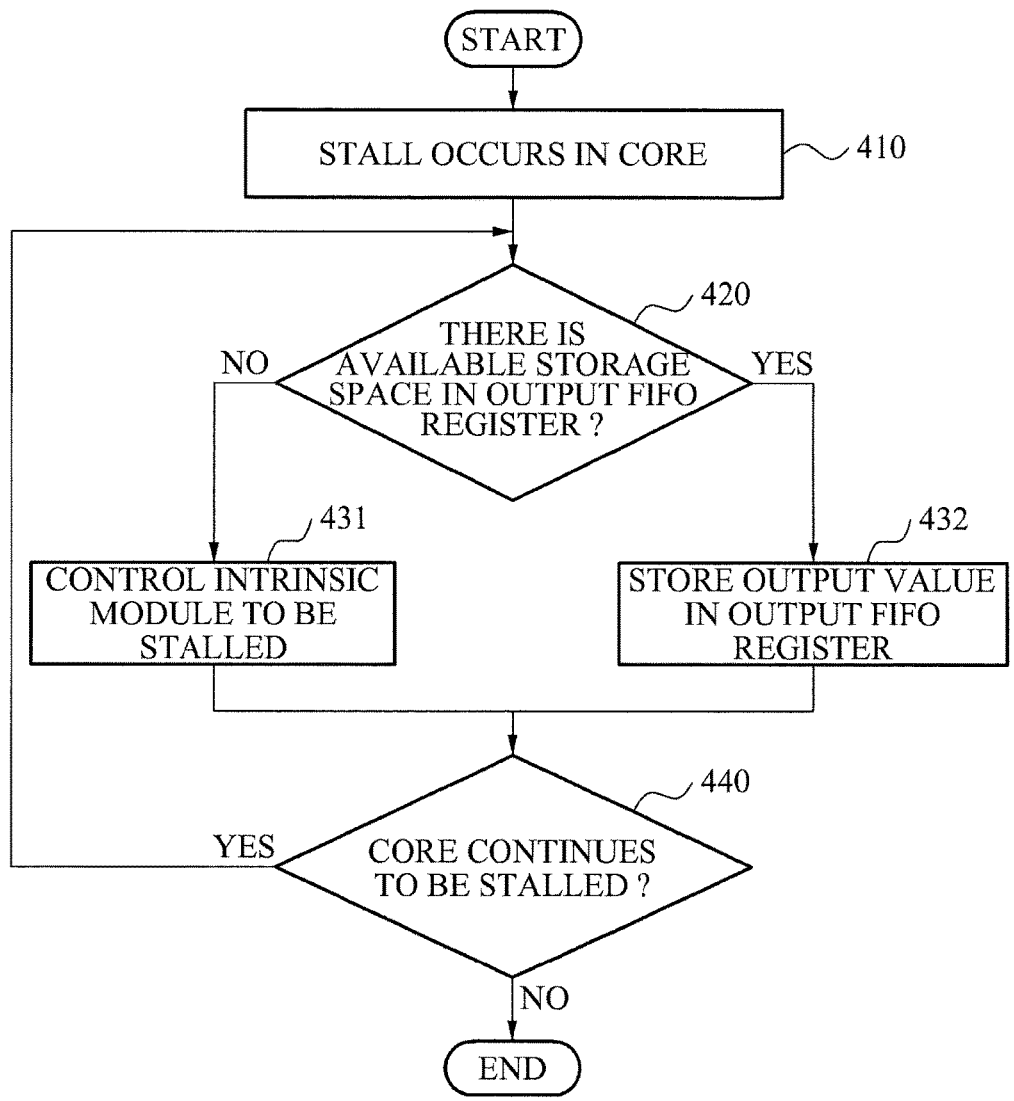
FIG. 4 illustrates a flowchart of an operation of the interface module of FIG. 3 in an example in which a stall occurs in the core of FIG. 3.

FIG. 4 illustrates a flowchart of an operation of the interface module 320 in an example in which a stall occurs in the core 310.

Referring to FIG. 4, when the stall occurs in the core 310, the interface module 320 may perform stall cycle hiding, using the output FIFO register 322.

Specifically, when the stall occurs in the core 310 in operation 410, the control unit 323 of the interface module 320 may determine whether there is an available storage space in the output FIFO register 322 in operation 420.

When there is no available storage space in the output FIFO register 322, the control unit 323 may control the intrinsic module 330 to be stalled in operation 431.

Conversely, when there is available storage space in the output FIFO register 322, the control unit 323 may store, in the output FIFO register 322, a result value, namely an output value, that may be received from the intrinsic module 330 in operation 432. Accordingly, the intrinsic module 330 may continue to be operated instead of being stalled, despite the core 310 being stalled.

In operation 440, the control unit 323 may determine whether the core 310 continues to be stalled. When it is determined that the core 310 continues to be stalled, the control unit 323 may repeat operations 420 through 440.

FIG. 5 illustrates a flowchart of an operation of the interface module 320 in an example in which a stall occurs in the intrinsic module 330.

Referring to FIG. 5, when the stall occurs in the intrinsic module 330, the interface module 320 may perform stall cycle hiding, using the input FIFO register 321.

Specifically, when the stall occurs in the intrinsic module 330 in operation 510, the control unit 323 may determine whether there is an available storage space in the input FIFO register 321 in operation 520.

When there is no available storage space in the input FIFO register 321, the control unit 323 may control the core 310 to be stalled in operation 531.

Conversely, when there is available storage space in the input FIFO register 321, the control unit 323 may store, in the input FIFO register 321, a request received from a functional unit of the core 310 in operation 532. Accordingly, the core 310 may continue to be operated, instead of being stalled, despite the intrinsic module 330 being stalled.

In operation 540, the control unit 323 may determine whether the intrinsic module 330 continues to be stalled. When it is determined that the intrinsic module 330 continues to be stalled, the control unit 323 may repeat operations 520 through 540.

The above-described example embodiments may be recorded in non-transitory computer-readable media, including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media, such as hard disks, floppy disks, and magnetic tape; optical media, such as CD ROM disks and DVDs; magneto-optical media, such as optical discs; and hardware devices that are specially configured to store and perform program instructions, such as read-only memory (ROM), random access memory (RAM), flash memory, and the like. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Examples of program instructions include both machine code, such as produced by a compiler, and files containing higher level code that may be executed by the computer, using an interpreter. The described hardware devices may be configured to act as one or more software modules in order to perform the operations of the above-described example embodiments, or vice versa.

Further, according to an aspect of the embodiments, any combinations of the described features, functions and/or operations can be provided.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A processor, comprising:
a core comprising a plurality of functional units;
an intrinsic module disposed outside the core; and
an interface module to perform relaying between the intrinsic module and a functional unit among the functional units,
wherein the interface module comprises an input first-in-first-out (FIFO) register, an output FIFO register, and a control unit, and
the control unit determines a stall of the intrinsic module based on an available storage space in the output FIFO register in response to a stall occurring in the core, and determines a stall of the core based on an available storage space in the input FIFO register in response to a stall occurring in the intrinsic module.

2. The processor of claim 1, wherein, in response to there being an available storage space in the output FIFO register, the control unit stores, in the output FIFO register, a result value received from the intrinsic module.

3. The processor of claim 1, wherein, in response to there being an available storage space in the input FIFO register, the control unit stores, in the input FIFO register, a request received from the core.

4. The processor of claim 1, wherein the interface module receives an operation request from the functional unit, transfers the received operation request to the intrinsic module, receives a result value corresponding to the operation request from the intrinsic module, and transfers the received result value to the functional unit.

5. The processor of claim 1, wherein, in response to a stall occurring in the core and there being an available storage space in the output FIFO register, the control unit continues to operate the intrinsic module without stalling the intrinsic module.

6. The processor of claim 1, wherein, in response to a stall occurring in the core and the output FIFO register being without available storage space, the control unit stalls the intrinsic module.

7. The processor of claim 1, wherein, in response to a stall occurring in the intrinsic module and there being an available storage space in the input FIFO register, the control unit continues to operate the core without stalling the core.

8. The processor of claim 1, wherein, in response to a stall occurring in the intrinsic module and the input FIFO register being without available storage space, the control unit stalls the core.

9. The processor of claim 1, wherein the control unit is disposed directly between the input FIFO register and the output FIFO register, and the intrinsic module is disposed directly between the input FIFO register and the output FIFO register.

10. The processor of claim 1, wherein the output FIFO register is disposed downstream from the intrinsic module, the intrinsic module is disposed downstream from the input FIFO register, and the core is disposed downstream from the output FIFO register and upstream from the input FIFO register.

11. An operating method of an external intrinsic interface, the operating method, comprising:
determining a stall of an intrinsic module based on an available storage space in an output first-in-first-out (FIFO) register included in an interface module in response to a stall occurring in a core comprising a plurality of functional units, the intrinsic module being disposed outside the core; and
determining a stall of the core based on an available storage space in an input FIFO register included in the interface module in response to a stall occurring in the intrinsic module.

12. The operating method of claim 11, further comprising:
in response to there being an available storage space in the output FIFO register, storing, in the output FIFO register, a result value received from the intrinsic module.

13. The operating method of claim 11, further comprising:
in response to there being an available storage space in the input FIFO register, storing, in the input FIFO register, a request received from the core.

14. The operating method of claim 11, further comprising:
receiving an operation request from one of the plurality of functional units, and transferring the received operation request to the intrinsic module; and
receiving a result value corresponding to the operation request from the intrinsic module, and transferring the received result value to the functional unit that transmits the operation request.

15. The operating method of claim 11, wherein the determining of the stall of the intrinsic module comprises, in response to a stall occurring in the core and there being an available storage space in the output FIFO register, continuing to operate the intrinsic module without stalling the intrinsic module.

16. The operating method of claim 11, wherein the determining of the stall of the intrinsic module comprises, in response to a stall occurring in the core and the output FIFO register being without available storage space, stalling the intrinsic module.

17. The operating method of claim 11, wherein the determining of the stall of the core comprises, in response to a stall occurring in the intrinsic module and there being an available storage space in the input FIFO register, continuing to operate the core without stalling the core.

18. The operating method of claim 11, wherein the determining of the stall of the core comprises, in response to a stall occurring in the intrinsic module and the input FIFO register being without available storage space, stalling the core.

* * * * *